United States Patent [19]
Ruckwardt

[11] Patent Number: 5,458,303
[45] Date of Patent: Oct. 17, 1995

[54] SINGLE-PIECE RETAINING ELEMENT

[75] Inventor: Hans-Werner Ruckwardt, Gollheim/Pfalz, Germany

[73] Assignee: TRW United Carr GmbH & Co. KG, Enkenbach-Alsenborn, Germany

[21] Appl. No.: 182,659

[22] Filed: Jan. 18, 1994

[30] Foreign Application Priority Data

Jan. 28, 1993 [DE] Germany .......................... 43 02 408.4

[51] Int. Cl.⁶ ...................................................... F16L 3/08
[52] U.S. Cl. ............................ 248/74.2; 248/68.1; 248/73
[58] Field of Search .............................. 248/71, 73, 74.2, 248/74.5, 68.1; 24/459; 174/135

[56] References Cited

U.S. PATENT DOCUMENTS

| | | | |
|---|---|---|---|
| 4,591,119 | 5/1986 | Kraus | 248/74.2 |
| 4,655,424 | 4/1987 | Oshida | 248/74.2 X |
| 4,899,964 | 2/1990 | Sick | 24/459 X |
| 5,033,701 | 7/1991 | Kraus | 248/71 |
| 5,170,984 | 12/1992 | Ruckwardt | 248/68.1 X |
| 5,209,441 | 5/1993 | Satoh | 174/135 X |
| 5,316,245 | 5/1994 | Ruckwardt | 248/68.1 |

*Primary Examiner*—J. Franklin Foss
*Attorney, Agent, or Firm*—Daniel G. Blackhurst

[57] ABSTRACT

The invention relates to a single-piece retaining element made of plastic designed for supporting at least one pipe or tubular member and comprising at least one attachment area 2 and at least one holding area 3, 4 for partial encompassing of the pipe line circumference. The attachment area 2 is connected with the holding area 3, 4 via at least one resilient cross piece of band or strap-like configuration.

9 Claims, 1 Drawing Sheet

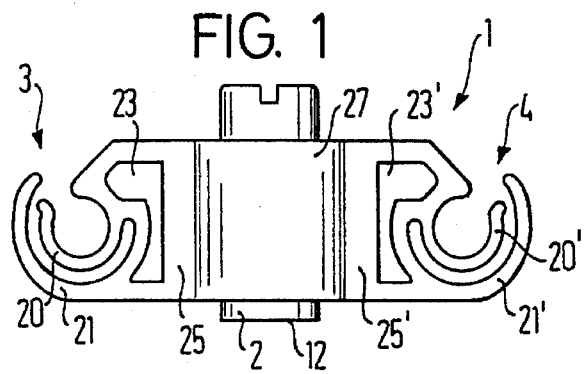
FIG. 1
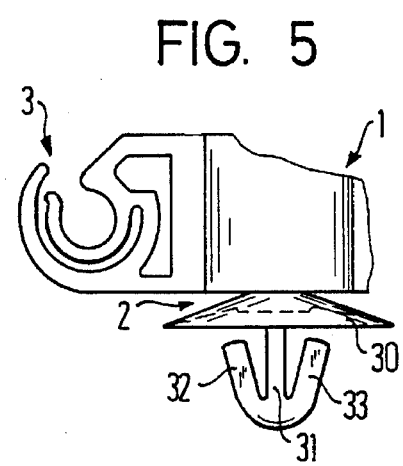
FIG. 5
FIG. 2
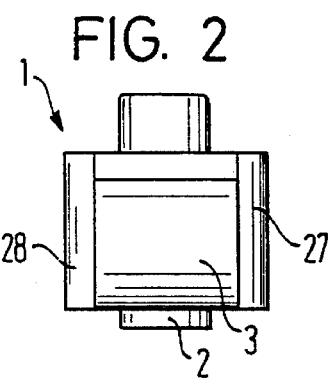
FIG. 6
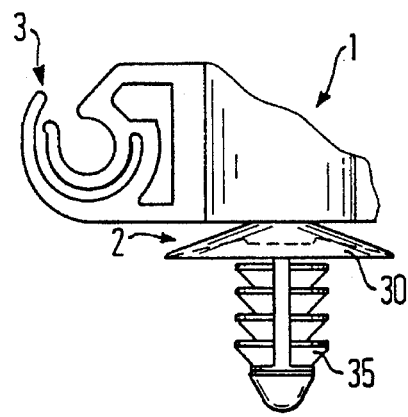
FIG. 3
FIG. 7
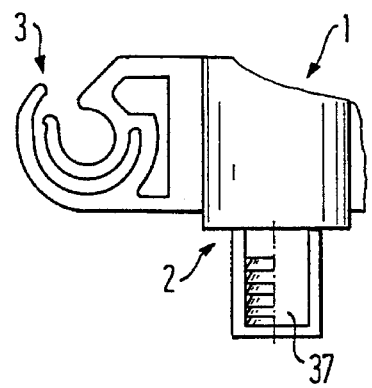
FIG. 4
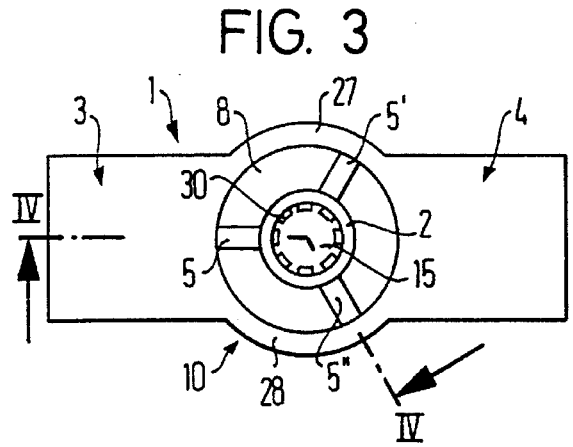
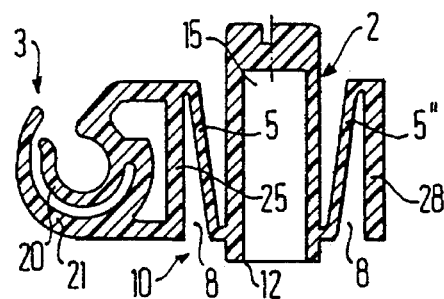

5,458,303

SINGLE-PIECE RETAINING ELEMENT

BACKGROUND OF THE INVENTION

The subject invention relates to a single-piece retaining element specifically intended for retaining and supporting at least one pipe line or similar member, with at least one attachment area for connection to a support and at least one retaining area for partial envelopment of the pipe line circumference.

A retaining element of this general type is already known in the state of the art (German Patent 3,002,031) and is used specifically for mounting gasoline lines in a motor vehicle. In this known arrangement, the mounting area comprises two dish-shaped units in the form of an inner dish that partially envelops the pipe line circumference and an outer dish that is spaced outwardly and surrounds the inner dish. The attachment area is located between two mounting areas and has a through aperture which is fastened via an insertion end to a profile bolt joined to a motor vehicle frame or body panel.

Additional known, single-piece retaining elements (British Patent 2,098,699A; British Printed Specification 1,379, 543; or German Printed Specification 2,816,181) have a similar construction. In each instance, there is a direct connection between the attachment area and one or more retaining areas for the mounting of pipe-shaped elements.

As a consequence of these known constructions, there results the drawback that noise formations and/or vibrations can be transmitted from the attachment area to the retaining areas or vice versa. This may produce, aside from reduced service life, also a reduction in driving comfort because of undesired noises.

In contrast thereto, the present invention has the task to provide a single-piece retaining element of the initially mentioned type which, while of simple construction, will avoid the aforementioned drawbacks and which will reduce vibrations and largely decrease transmission of noise.

SUMMARY OF THE INVENTION

This task is solved according to the invention by having the attachment area connected with the retaining area via at least one resilient strip or strap-like member. In such an arrangement there is beneficially produced an intentional selectively pin-pointed separation between the attachment area and the retaining area, so that undesirable vibrations and noises cannot be transmitted between the two parts of the retaining element.

The separation between attachment area and retaining area, on the other hand, is already part of the known state of the art (German Patent 4,034,545 A1 and German Patent 4,043,546 A1). These known constructions, however, provide retaining elements that are designed in either two or three pieces, so that there will result therefrom differences both in the manufacture, in the cost and material expenditures, as well as in the design.

In further refinement of the subject invention, the attachment area can be positioned between two retaining areas, whereby the two retaining areas are connected to form one basic body and the basic body is connected with the cylindrically designed attachment area via several resilient strap-like cross-pieces. Preferably, three resilient cross-pieces distributed over the circumference connect the basic body with the attachment area.

In order to keep the distance between the attachment area and the retaining area as long as possible, the cross pieces may extend diagonally through an intermediate space between the basic body and the attachment areas. In a unilaterally open attachment area, the cross-pieces can extend from the open end of the storage area through the intermediate space towards the diagonally opposite side of the basic body.

In a design of the retaining element in which each retaining area comprises two dish-shaped mountings with an interior dish partially surrounding the pipe line circumference and a spaced exterior dish surrounding the inner dish, the inside of each retaining area can have a recess that is delineated by a wall. The walls of both retaining areas are connected with each other via joining areas and encompass an intermediary space in the interior of which is arrangement the attachment area. The inside of the attachment area can exhibit longitudinal ribs distributed about the circumference.

Moreover, there is the possibility that the cross-pieces are not rectilinear but have, for example, an undulant shape so that there is beneficially produced further reduction of undesirable vibrations and noise transmission.

BRIEF DESCRIPTION OF THE DRAWINGS

In the description that follows, the invention is described in more detail, using the preferred embodiment illustrated in the drawings wherein:

FIG. 1 is a side elevational view of a retaining element with an attachment area and retaining areas arranged on both sides of same;

FIG. 2 is an end elevational of the right end of the retaining element shown in FIG. 1;

FIG. 3 is a bottom view of the retaining element according to FIG. 1;

FIG. 4 is a cross-sectional view taken on line IV—IV of FIG. 3;

FIGS. 5 through 7 are partial side elevational views showing different designs of the attachment area of the retaining element.

DETAILED DESCRIPTION OF THE PREFERRED EMBODIMENT

Referring more particularly to the drawings wherein the showings are for the purpose of illustrating a preferred embodiment of the invention only and not for the purpose of limiting same, FIG. 1 shows a single-piece retaining element 1, made of plastic and generally comprising an attachment area 2 that is arranged between two retaining areas 3 and 4. Each of the retaining areas 3 and 4 serves for mounting, for instance, a pipe line or similar element (which is not described in more detail). To that end, each retaining area 3, 4 is comprised of two dish-shaped mountings, with an inner dish 20 or 20' that is arranged to partially surround the pipe line circumference. An outer dish 21 or 21' surrounds the inner dish at a radially spaced location. The two mounting areas 3 and 4, according to FIG. 3, are connected via two joining areas 27 and 28 that form a basic body 10.

Moreover, as is apparent from FIG. 3, the joining areas 27 and 28, as well as the inner sides of the mounting areas 3 and 4, encompass an intermediate space 8 in the interior of which there is arranged the attachment area 2. The attachment area 2 is, for example, designed in the shape of a cylinder and connected with the basic body 10 via three resilient strap-like cross-pieces 5, 5', 5" that are distributed in spaced relationship over the circumference.

The attachment area 2 of the retaining element exhibits, as seen in FIG. 4, an aperture 15 with an open end 12. As is likewise apparent from FIG. 4, cross-pieces 5, 5', and 5" extend from the open end 12 of the storage area 2 through the intermediate space 8 to the diagonally opposite side of the basic body 10. Thus, the length of the cross-pieces is increased and there is created a greater distance so that undesirable vibrations are avoided or reduced, and improved noise attenuation is achieved.

It is apparent from FIGS. 1 and 4 that each retaining area 3, 4 exhibits on the inside a recess 23 or 23', which is delineated by a wall 25 or 25'. The walls pass over into the joining areas 27 and 28 and constitute part of the basic body 10.

According to FIG. 3, the storage area 2 has on the inside longitudinal ribs 30 that are distributed over the circumference of aperture 15. The longitudinal ribs 30 can also embed themselves in a profile bolt (not shown) which, in turn is attached, for example, to the body of the motor vehicle.

If pipe-lines are pressed into the inner dish 20 or 20', so that they are placed in the retaining element according to the invention, then it is guaranteed, because of the extensive separation between attachment area 2 on the one hand and the retaining areas 3 and 4 on the other hand, that undesirable vibrations or noises can no longer to any significant degree be transmitted between these two areas of the retaining element. Only the three cross-pieces 5, 5', and 5", that are distributed in spaced relationship over the circumference constitute the connection between the attachment area 2 and the retaining area 3 and 4. As noted earlier, the cross-pieces are designed in such manner that the greatest possible distances result In addition, the cross-pieces 5, 5', and 5" have a flexible band or strap-like construction to assure further reduction in vibration transmission.

Instead of the rectilinear design for the cross-pieces according to FIG. 4, the possibility also exists to construct same in an undulant or wave form shape, for example, so that additional positive distance elongation is achieved.

While in the embodiment of retaining element 1 according to FIGS. 1 through 4, the attachment area 2 is designed as an aperture 15 with longitudinal ribs 30, further design possibilities are indicated in FIGS. 5 through 7. According to FIG. 5, the attachment area 2 can comprise a foot 31 with two opposing elastic wings 32 and 33, above which there is arranged an elastic, circumferential sealing lip 30.

Between the underside of the sealing lip 30 and the respective upper edge of the elastic wings 32 and 33, a support with an appropriately designed aperture can embed itself. Thus, the retaining element 1 is attached in a functionally secure manner.

The design according to FIG. 6 comprises a bolt part 35, with individual conical elements and an elastic circumferential sealing lip 30. Thus, it is possible to embed the bolt part into an aperture of a support with sealing about the aperture.

In the two aforementioned examples according to FIG. 5 and FIG. 6, the sealing lip 30 may also be omitted.

In the construction according to FIG. 7, a specially designed holding part 37 is employed. This design has sequentially arranged internal ribs or fins that can embed themselves in a profile bolt attached to a support.

In each case there exists a single-piece plastic retaining element that creates a substantial pin-pointed separation between the retaining areas 3 and 4 and the attachment area 2. The shape of the attachment area and the retaining area is immaterial; instead of half-dishes of the retaining area, same can have another construction form and can fasten other elements instead of pipe lines.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A single-piece retaining element made of plastic for mounting and supporting an associated member and including an attachment portion for joining the element to a support and at least two retaining portions for partially surrounding and gripping the associated member characterized in that the attachment portion is generally cylindrical and includes a centrally located body connected with the retaining portions by several elongated flexible and resilient strap-like cross-pieces.

2. A retaining element as defined in claim 1 characterized in that three of the flexible and resilient cross-pieces are distributed about the circumference of the retaining portion and connect the centrally located body (10) with the retaining portion.

3. A retaining element as defined in claim 1 characterized in that the cross-pieces extend diagonally through an intermediate space between the body and the attachment portion.

4. A retaining element as defined in claim 3 with the attachment portion having an open end and wherein the cross-pieces extend from one end of the attachment portion through the intermediate space toward a diagonally opposite side of the central body.

5. A retaining element as defined in claim 1 wherein each retaining portion comprises two dish-shaped mountings with an inner dish which partially surrounds the circumference of the associated member and an outer dish which surrounds the inner dish at a radial outward location characterized in that each retaining portion includes an internal recess delineated by a wall and wherein the walls of each retaining portion are connected with each other via joining areas and encompass an intermediary space in the interior of which there is arranged the attachment portion.

6. A retaining element as defined in claim 1 characterized in that the attachment portion has an internal opening with internal longitudinal ribs that are distributed over the circumference of the opening.

7. A retaining element as defined in claim 1 characterized in that the attachment portion comprises a profile bolt.

8. A retaining element as defined in claim 1 characterized in that the attachment portion has elastic wings.

9. A single-piece retaining element made of plastic for mounting and supporting an associated member and including an attachment portion for joining the element to a support and including at least one retaining portion for partially surrounding and gripping the associated member characterized in that the attachment portion includes a central body portion having an outer end that extends axially into an opening in the retaining portion, the opening in the retaining portion having a size such that its inner wall is radially outwardly of the exterior of the central body portion to enclose an intermediate open space, the retaining portion supported from the central body by several flexible and resilient strap-like cross-pieces that are spaced circumferentially about the central body and extend diagonally through the intermediate open space, the cross-pieces each having spaced ends with one end of each cross-piece joined to the outer end of the central body portion and the other end of each cross-piece joined to the interior wall of the retaining portion at a diagonally opposite axially spaced location.

* * * * *